(12) United States Patent
Soelberg et al.

(10) Patent No.: US 9,111,117 B2
(45) Date of Patent: Aug. 18, 2015

(54) METHODS, DEVICES, AND COMPUTER READABLE STORAGE FOR SHARING SENSITIVE CONTENT SECURELY

(71) Applicants: AT&T Intellectual Property I, L.P., Atlanta, GA (US); AT&T Mobility II LLC, Atlanta, GA (US)

(72) Inventors: Emily Soelberg, Atlanta, GA (US); Jeffrey Mikan, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/051,857

(22) Filed: Oct. 11, 2013

(65) Prior Publication Data
US 2015/0106955 A1    Apr. 16, 2015

(51) Int. Cl.
G06F 21/00 (2013.01)
G06F 21/62 (2013.01)
H04L 29/06 (2006.01)

(52) U.S. Cl.
CPC ........ *G06F 21/6245* (2013.01); *H04L 63/0853* (2013.01)

(58) Field of Classification Search
CPC combination set(s) only.
See application file for complete search history.

(56) References Cited

U.S. PATENT DOCUMENTS

| | | | |
|---|---|---|---|
| 7,627,608 B2 | 12/2009 | Strandell et al. | |
| 7,849,135 B2 | 12/2010 | Agrawal et al. | |
| 8,065,328 B2 | 11/2011 | Strandel et al. | |
| 8,274,694 B2 | 9/2012 | Silverbrook et al. | |
| 8,321,957 B2 | 11/2012 | Austin et al. | |
| 8,402,274 B2 | 3/2013 | Jun | |
| 8,402,509 B2 | 3/2013 | Yang | |
| 8,417,953 B2 | 4/2013 | Schröter | |
| 2008/0133678 A1 | 6/2008 | Woodham et al. | |
| 2008/0276091 A1 | 11/2008 | Welin et al. | |
| 2009/0100134 A1 | 4/2009 | Svennarp | |
| 2009/0234876 A1 | 9/2009 | Schigel et al. | |

(Continued)

FOREIGN PATENT DOCUMENTS

| EP | 20080290993 | 4/2010 |
|---|---|---|
| KR | 681562 | 12/2006 |
| KR | 2006125058 | 2/2007 |

OTHER PUBLICATIONS

Authentify, Phone Authentication—Data Services, www.authentify.com/solutions/tds.html, 1 page (printed Aug. 8, 2013.
Authentify, Phone-Based Two Factor Authentication, www.authentify.com/solutions/2_factor_athentication.html, 2 pages (printed Aug. 8, 2013).

(Continued)

*Primary Examiner* — Ghazal Shehni
(74) *Attorney, Agent, or Firm* — Gardner Groff Greenwald & Villanueva, PC

(57) ABSTRACT

Sensitive content is securely shared. A request is received from a first communication device to share sensitive content. The first communication device is associated with an account for a communication service provided by a network provider. A message including a link to the sensitive content is sent to a second communication device associated with a phone number. That message is addressed to the second communication device. An authentication message is received, indicating that the second communication device is associated with the phone number. Responsive to receipt of the authentication message, the sensitive content is made accessible via the second communication device without requiring that the second communication device be associated with an account for the communication service provided by the network provider.

20 Claims, 5 Drawing Sheets

(56) References Cited

U.S. PATENT DOCUMENTS

| | | | |
|---|---|---|---|
| 2009/0327244 A1 | 12/2009 | Rizal | |
| 2011/0185406 A1* | 7/2011 | Hirson et al. | 726/6 |
| 2011/0300834 A1 | 12/2011 | Ni | |
| 2012/0151058 A1 | 6/2012 | Lee | |
| 2013/0066908 A1 | 3/2013 | Niranjan | |
| 2013/0150097 A1 | 6/2013 | Chou et al. | |

OTHER PUBLICATIONS

Confident Multifactor Authentication (TM)—Two-Factor Authentication Using Images, 3 pages (printed Aug. 8, 2013).

"PhoneFactor: Phone-Based Two-Factor Authentication", PhoneFactor, Inc., Aug. 8, 2013, <https://www.phonefactor.com/wp-content/pdfs/PhoneFactor-whitepaper.pdf>.

* cited by examiner

METHODS, DEVICES, AND COMPUTER READABLE STORAGE FOR SHARING SENSITIVE CONTENT SECURELY

TECHNICAL FIELD

The present disclosure relates generally to communication and, more particularly, to sharing sensitive content.

BACKGROUND

Increasingly, vital and sensitive information, such as medical records, tax forms, legal documents, etc., is moving from a paper form to a digital format. With this transition, such information is increasingly being stored offsite, e.g., in the cloud. There is often a need to share such content with another person. However, there are security challenges associated with sharing sensitive content.

For example, one way in which sensitive content may be shared is by attaching the content to an email and sending the email to a trusted recipient. However, there is no way to prevent the email (along with the attached content) from being forwarded to an unintended recipient. Also, there is a risk that the email may be sent to the wrong email address. Further, there is a risk that an unintended recipient may be able to log into the intended recipient's email account and access the sensitive content.

Another way in which sensitive content may be shared is by requiring an intended recipient to log onto a website to be able to access sensitive content. However, this requires that an intended recipients register with the website and remember a username and password, which can be cumbersome. Some intended recipients may miss important sensitive information simply because it is too inconvenient for them to register and/or log into the website to access the sensitive content. Also, using a website in this manner provides no way to verify that a user who registers with the website is actually an intended recipient, as usernames and passwords may be easily stolen.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for securely sharing sensitive content. The method comprises receiving a request from a first communication device to share sensitive content. The first communication device is associated with an account for a communication service provided by a network provider. A message including a link to the sensitive content is sent to a second communication device associated with a phone number. That message is addressed to the second communication device. An authentication message is received, indicating that the second communication device is associated with the phone number. Responsive to receipt of the authentication message, the sensitive content is made accessible via the second communication device without requiring that the second communication device be associated with an account for the communication service provided by the network provider.

According to another embodiment a device for securely sharing sensitive content comprises a processor and a memory. The memory has instructions stored thereon which, when executed by the processor, cause the processor to perform operations. The operations comprise receiving a request from a first communication device to share sensitive content. The first communication device is associated with an account for a communication service provided by a network provider. The operations further comprise sending a message including a link to the sensitive content to a second communication device associated with a phone number. The message is addressed to the second communication device. The operations further comprise receiving an authentication message indicating that the second communication device is associated with the phone number. Responsive to receipt of the authentication message, making the sensitive content accessible via the second communication device without requiring that the second communication device be associated with an account for the communication service provided by the network provider.

According to another embodiment, a computer readable medium has instructions stored thereon which, when executed by a processor, cause the processor to perform operations for securely sharing sensitive content. The operations comprise receiving a request from a first communication device to share sensitive content. The first communication device is associated with an account for a communication service provided by a network provider. The operations further comprise sending a message including a link to the sensitive content to a second communication device associated with a phone number. The message is addressed to the second communication device. The operations further comprise receiving an authentication message indicating that the second communication device is associated with the phone number. Responsive to receipt of the authentication message, making the sensitive content accessible via the second communication device without requiring that the second communication device be associated with an account for the communication service provided by the network provider.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, sensitive content may be shared with an intended recipient (or multiple intended recipients) without requiring that the intended recipient have an account with a communication service provider that is used by the content sharer. The sharing of content is made sensitive verifying that the device receiving the content is the device of the intended recipient. Thus, for example, sensitive content, such as medical records, can be shared with an intended recipient by sending a message including a link to the medical records to a recipient's communication device. When the recipient attempts to access the sensitive information using the link, the identity of the recipient's communication device is verified. The link is only accessible if the device being used to access the link is verified.

As an illustrative example, if a message including a link to sensitive content is sent to a mobile phone, the link would be only be accessible using the mobile phone that received the link (or another device that had been previously associated with the mobile phone). This is described in further detail in the embodiments that follow.

Figure 1:
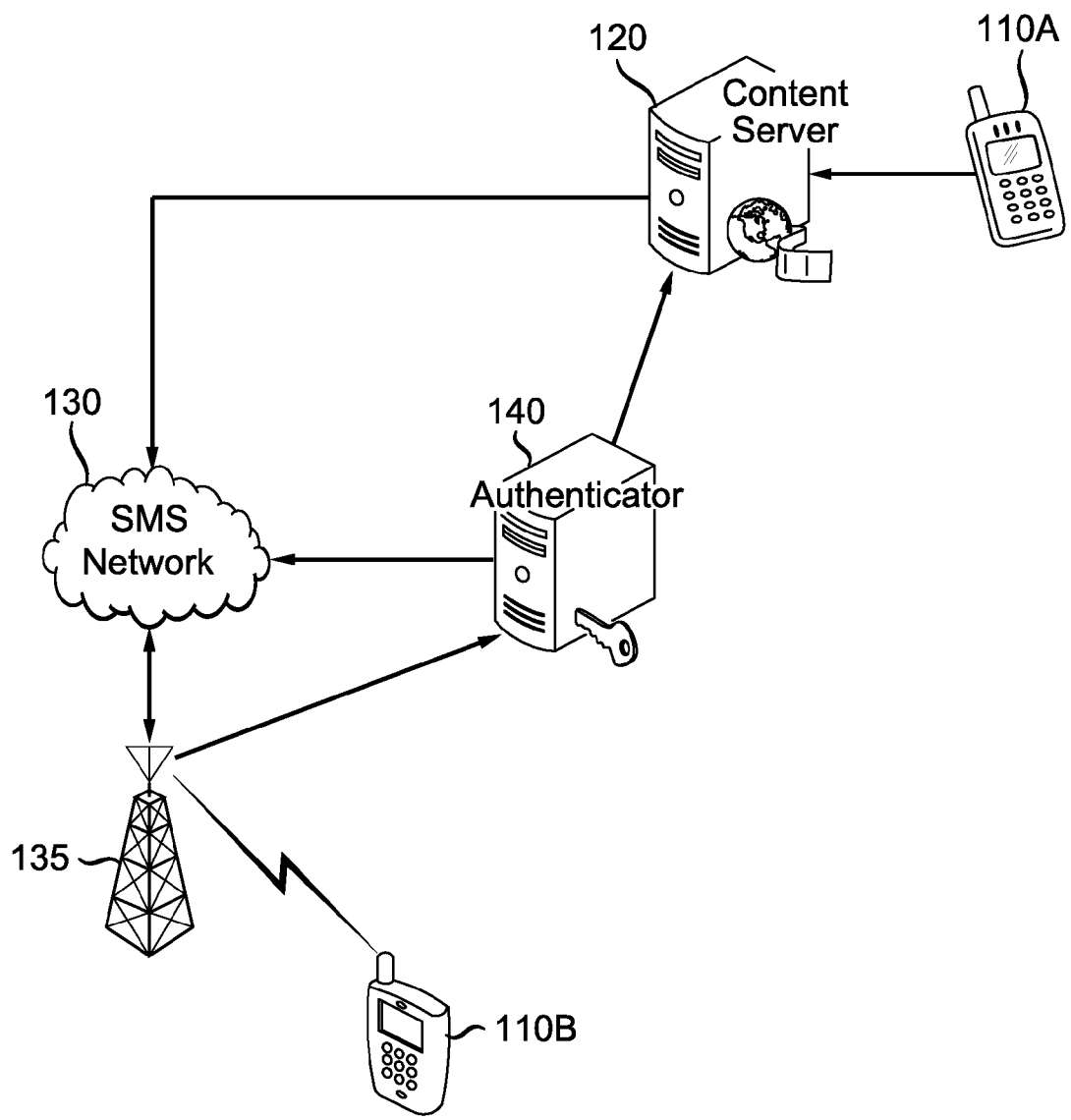
FIG. 1 illustrates an environment in which content may be shared according to an illustrative embodiment.

FIG. 1 illustrates an environment in which content may be shared according to an illustrative embodiment. As shown in FIG. 1, a sender communication device, such as a mobile communication device 110A, sends a message to a content server 120, via a network, such as the Internet (not shown for simplicity of illustration). The message requests that sensitive content be shared with a recipient communication device, such as a mobile communication device 110B. Although only one sender communication device 110A and one recipient communication device 110B are shown in FIG. 1 for simplicity of illustration, it should be appreciated that there may be any number of communication devices 110A and 110B. For example, the sender communication device 110 may send a request to the content server 120 to share the sensitive content with multiple recipient communication devices.

According to this embodiment, the request from the communication device 110A includes a phone number associated with the communication device 110B. The content server 120, in turn, sends a message including a link to the sensitive content, in the form of, e.g., a Universal Resource Locator (URL). The message is addressed to phone number associated with the communication device 110B. The message may be sent as, e.g., a short message service (SMS) message, over a network 130 and a base station 135. Although an SMS message is described herein as an example of a message that may be used for illustrative purposes, those skilled in the art will be appreciate that other forms of messaging may be used. For example, systems using an internet protocol might be used for messaging via an Internet Protocol Multimedia Subsystem (IMS) server across other bearer types.

The SMS network 130 and the base station 135 may be part of a cellular network. The cellular network may operate according to telecommunications standards, such as Global System for Mobile communications (GSM) and a Universal Mobile Telecommunications System (UMTS). It should be understood, however, that the cellular network may be implemented in wireless networks that use any existing or yet to be developed telecommunications technology. For example, some other suitable cellular telecommunications technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

Referring again to FIG. 1, when the communication device 110B receives the SMS message, and a user opens the message and clicks on the URL contained in the SMS message, a message is automatically sent by the communication device 110B to an authentication server 140 via the base station 135. As the message is transmitted, verification data including a header is created by the cellular network. The header includes data session protocol information created by the cellular network for the cellular communication session. The header is placed into the message that is sent to the authentication server 140 as an HTTP request. The header may include the phone number of the communication device 110B. Alternatively, the header may include a header number that the cellular network provider uses to reference a static or dynamic table of phone numbers (stored, e.g., in a server within the cellular network) to determine the phone number associated with the communication device 110B. The authentication server 140 compares the phone number included in the header (or derived by the cellular network based on the header) with the phone number associated with the communication device 110E to which the message containing the sensitive content is addressed. If the phone numbers match, the authentication server 140 sends an authentication message to the content server 120, and the content server 120 makes the sensitive content accessible to a user of the mobile communication device 110B.

If the initial message is sent from a communication device 110A associated with one carrier, but the phone number of the communication device is associated with a different carrier, header information created by the different carrier may be still be used for authentication, e.g., by the different carrier allowing verification of the header information.

The content server 120 and the authentication server 140 may be implemented with a device, such as that described in detail with reference to FIG. 5. Although depicted as a mobile communication device, the communication device 110A may be implemented with any communication device capable of communicating with the content server 120, e.g., a personal computer or a tablet. Similarly, although the communication device 110B is depicted as a mobile communication device, it may be implemented with any communication device having a phone number to which an SMS message may be sent. In addition, the communication device 110B may be implemented with a device, such as a tablet, that is associated with a phone number. The tablet may be used to view the SMS messages addressed to the phone number responsive to a user of the table logging in with a username and password.

Figure 2:
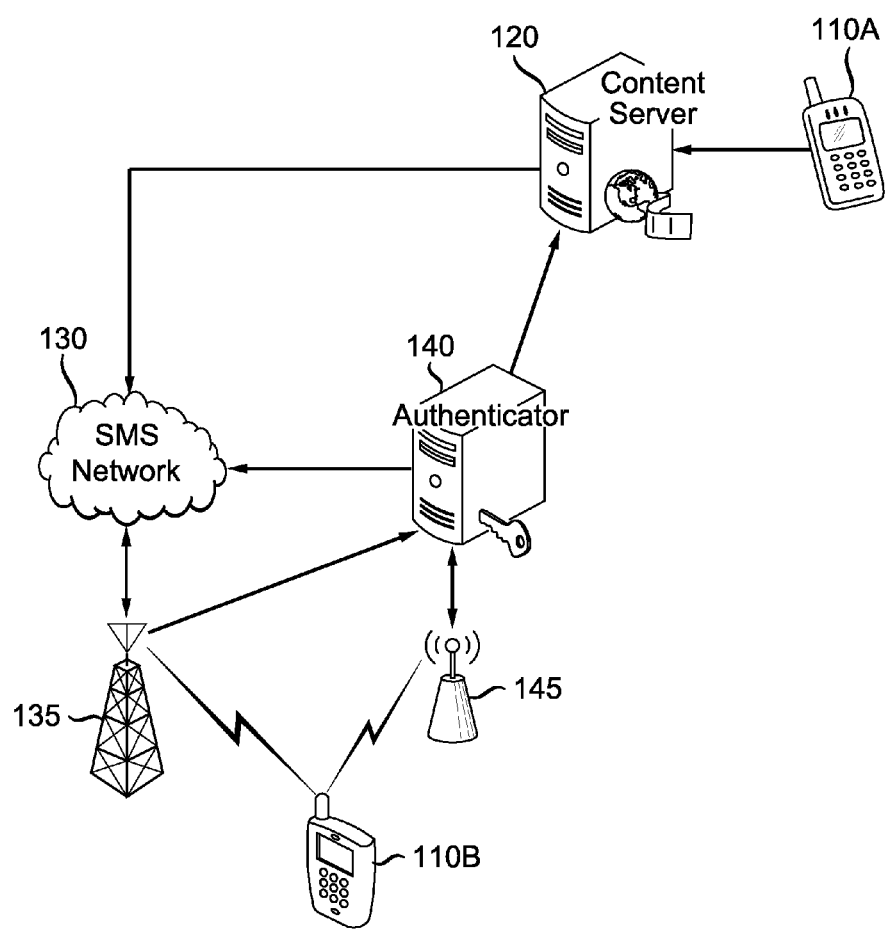
FIG. 2 illustrates an environment in which content may be shared according to another illustrative embodiment.

FIG. 2 illustrates an environment in which content may be shared according to another illustrative embodiment. Referring to FIG. 2, the communication device 110A sends a request to the content server 120 to share sensitive content with the communication device 110B, including the phone number associated with the communication device 110B. The content server 120 sends a message including a link to the sensitive content to the communication device 110B via the SMS network 130 and the base station 135 in a similar manner as described above. However, according to this embodiment, when the message is received at the communication device 110B, and the user clicks on the URL, the communication device 110B automatically sends a message requesting authentication information to the authentication server 140 via a network other than the cellular network, e.g., a WiFi network. The message may be sent via the WiFi network because, e.g., the user has elected to use WiFi for internet access rather than the cellular network.

According to this embodiment, the message from the communication device is sent to WiFi antenna 145, which, in turn, relays the message to the authentication server 140 via the WiFi network (not shown for simplicity of illustration). Because the message is transmitted over the WiFi network instead of the cellular network, there is no network-created header information to available to the authentication server 140 to authenticate the communication device 110B. Thus, the message sent to the authentication server 140 requests authentication information, such as a PIN. The authentication server 140 creates a PIN and sends it to the communication device 110B, e.g., as an SMS message, over the SMS network 130 and the base station 135. When the SMS message is received and opened by a user of the communication device 110B, the user enters the PIN, causing a message that contains the PIN entered by the user to be sent to the authentication server 140 as verification data over the WiFi network. The authentication server 140 verifies that the PIN received from the communication device 110B matches the PIN that was sent to the communication device 110B from the authentication server 140. If the PINs match, the authentication server 140 sends an authentication message to the content server 120. The content server 120, in turn, makes the sensitive content accessible to the user of the communication device 110B.

As an alternative to the user of the communication device 110B entering a PIN received in an SMS message after the communication device 110B requests the PIN from the authentication server 140, the communication device 110B may include an application that has access to the SMS application on the communication device 110B and that is launched responsive to a user clicking on the URL included in the SMS message sent to the communication device 110B. Once launched, the application. receives a background SMS message from the authentication server 140 that is addressed to the communication device 110B. The background message may include a key, and the application in the communication device 110B may create a message to the authentication server 140 that includes the key. Upon authentication of the key, the authentication server 140 may send an authentication message to the content server 120, and the content server 120 may then make the sensitive content available to a user of the communication device 110B.

In the embodiments described above, a phone number is used as an addressing mechanism. As phones numbers are in widespread use, this is a very practical addressing mechanism. As described above with reference to FIG. 1, a phone number may also be a useful authentication mechanism. However, it should be appreciated that other addressing and/or authentication mechanisms may be used, in combination with the phone number. These alternative mechanisms are described below.

Figure 3:
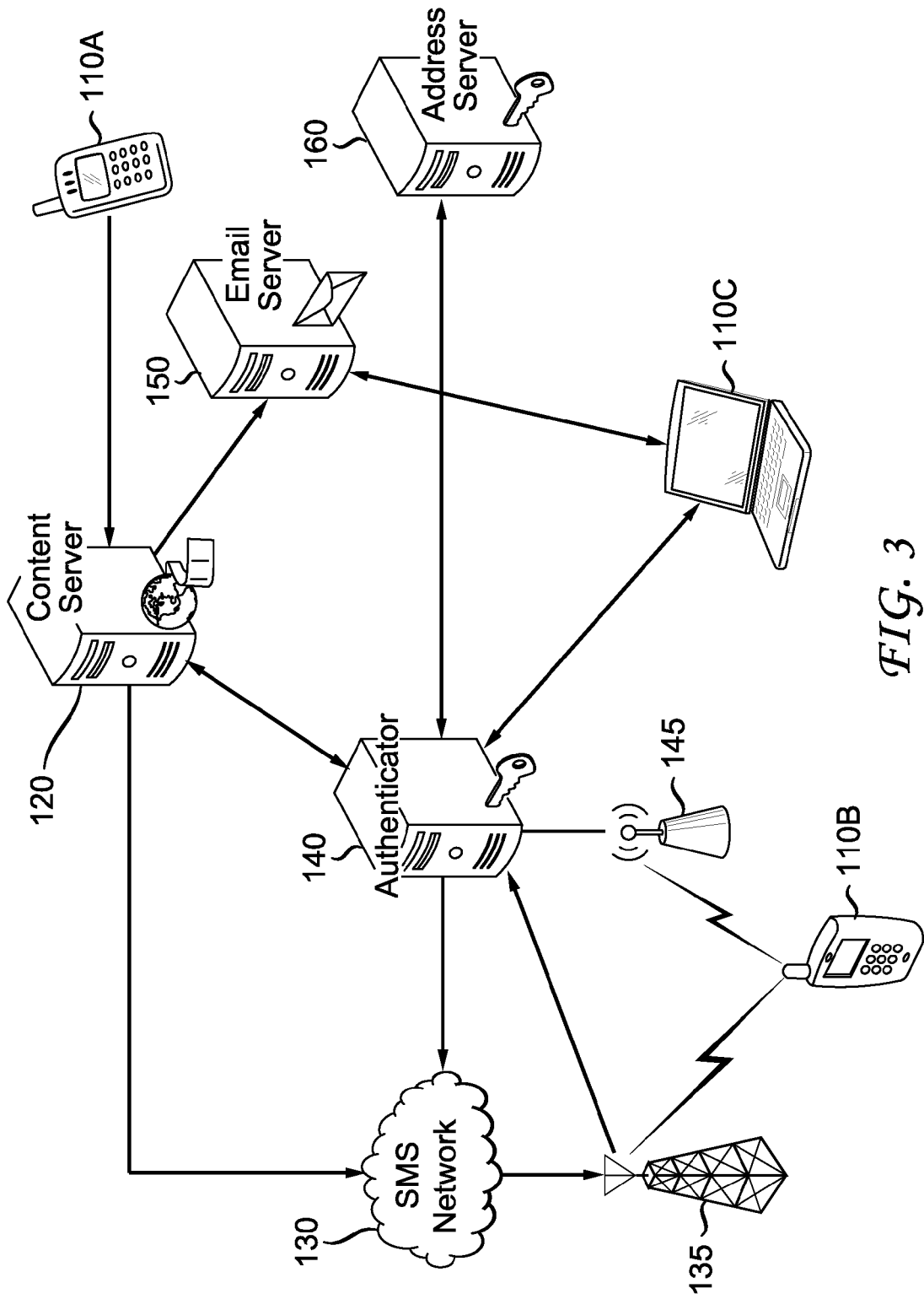
FIG. 3 illustrates an environment in which content may be shared according to additional illustrative embodiments.

FIG. 3 illustrates an environment in which content may be shared according to additional illustrative embodiments. As shown in FIG. 3, a request to share sensitive content is received from the communication device 110A. In contrast to the embodiments described above, however, a phone number associated with the communication device 110B may not be available to communication device 110A, e.g., because a user of the communication device 110A does not know the phone number. However, the communication device 110A may still request that sensitive content be shared with communication device 110B by including an email address associated with the communication device 110B in the request for sensitive content that is sent to the content server 120.

In this scenario, the content server 120 sends a message to the authentication server 140 over, e.g., the Internet. The message includes a request to link the URL associated with the sensitive content with the email address received from the communication device 110A. The content server 120 also sends a message including the URL to an email server 150 via, e.g, the Internet. The URL includes a token which the email server 150 uses to link the URL to the email address. The email server 150 also sends an email message containing the URL to a communication device 110C, e.g., a laptop that is associated with the communication device 110B. The communication device 110C may be associated with the communication device 110B in the sense that both devices belong to or are used by the same user, both devices may be used to access the same account, e.g., an email account, etc. The communication device 110C sends a request for authentication information to the authentication server 140 via, e.g, the Internet.

If the email address of the communication device 110C is not linked to the phone number of the communication device 110B, e.g., by an authorized user of the communication devices 110B and 110C indicating in advance that the email address of the communication device 110C is associated with the phone number of the communication device and communicating this information to, e.g., a service provider of the cellular network, then the authentication server 140 sends a request to an address book server 160 to provide a phone number that corresponds to the email address. The address book server 160 may be a third party server, such as a server associated with a social website (e.g., Facebook®), or the address book server 160 may be a server that stores the address book of the communication device 110A that initiated the request for sensitive content. The address book server 160 determines the phone number of the communication device 110B that is associated with the email address of the communication device 110C and provides the phone number to the authentication server 140.

If the email address of the communication device 110C is linked in advance to the phone number of the communication device 110B, then the authentication server 140 need not send a message to the address book server 160 to obtain the phone number associated with the email address. Instead, the authentication server 140 may obtain the phone number associated with the email address, e.g., from an address book stored in a server of the cellular network.

Once the phone number associated with communication device 110B is obtained, the authentication server 140 sends, e.g., an SMS message containing authentication information, e.g., a PIN to the communication device 110B via the SMS network 130 and the base station 135. When the SMS message is received and opened by a user of the communication device 110B, the user enters the PIN, causing a message containing the PIN entered by the user to be sent to the authentication server 140 over, e.g., the WiFi network. The authentication server 140 verifies that the PIN sent by the communication device 110B matches the PIN that was sent to the communication device 110B from the authentication server 140. If the PINs match, the authentication server 140 sends an authentication message to the content server 120. The content server 120, in turn, makes the sensitive content accessible to the user of the communication device 110B.

In addition or instead of entering the PIN at the communication device 110A, a user may enter the PIN at the communication device 110C. The communication device 110C, in turn, sends a message containing the entered PIN to the authentication server 140, and the authentication server authenticates the entered PIN in a similar manner as described above. Once the PIN is authenticated, the authentication server 140 and sends an authentication message to the content server 120. The content server 120, in turn, makes the sensitive content accessible to the user of the communication device 110C.

Figure 5:
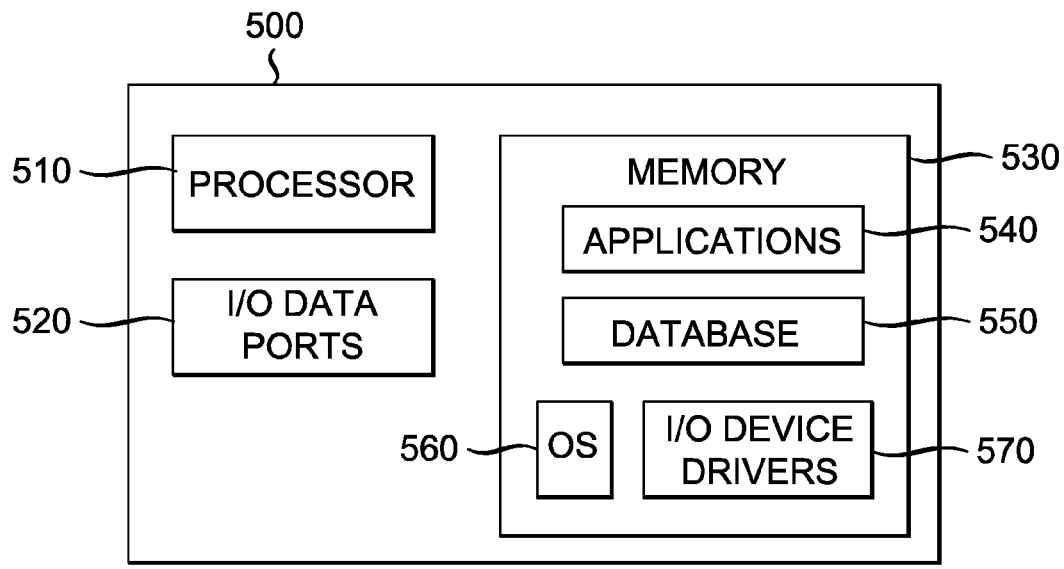
FIG. 5 illustrates a device for sharing sensitive content according to illustrative embodiments.

It should be appreciated that the email server 150 and the address book server 160 may be implemented with a device such as that depicted in FIG. 5.

As an alternative to using an SMS message with a PIN for authentication, as described above, according to another embodiment, authentication may instead be performed by a third party using the communication device 110C. This embodiment may also be understood with reference to FIG. 3.

Referring again to FIG. 3, the communication device 110A may have the phone number associated with the communication device 110B and May also have the email address of the communication device 110C. In this scenario, the communication device 110A sends a request to the content server 120 to share sensitive content, including the phone number associated with the communication device 110B. The content server 120 sends a message, including a link to the sensitive content, to the communication device 110B via the SMS network 130 and the base station 135 in a similar manner as described above with reference to FIGS. 1 and 2. Also, the content server 120 sends a message to the authentication server 140 over, e.g., the Internet, requesting to link the URL associated with the sensitive content with an email address associated with the communication device 110C a manner similar to that described above. If the phone number associated with the communication device 110B is linked to the email address of the communication device 110C, no further action needs to be taken by the authentication server 140 to authenticate this association. However, if the phone number is not linked to the email address, the authentication server 140 may request that the address book server 160 provide an email address that corresponds to the phone number.

When the SMS message including the URL is received at the communication device 110B, instead of the user of the communication device 110B clicking on the URL, according to this embodiment, the user enters the URL at the communication device 110C. The communication device 110C then sends a request for authentication information to the authentication server 140, and the authentication server 140 verifies that the email address of the communication device 110C is linked with the phone number of the communication device 110B in a manner similar to that described above. Once the authentication server 140 has verified that the phone number of the communication device 110B is associated with the email address of the communication device 110C, the authentication server 140 sends a challenge request to the communication device 110C, requesting that the communication device 110C provide third party authentication. Third party authentication may be provided by, for example, a user of the communication device 110C logging into a third party website, e.g., Facebook®, and entering, e.g., login data, such as a username and password. Once the user has logged in, the "public" email and phone number associated with the third party website are sent from the communication device 110C to the authentication server 140. The authentication server 140 determines whether the "public" phone number and email address associated with the third party website match the phone number included in the initial request to share sensitive content received from the communication device 110A, as well as the email address linked to that phone number. When the authentication server 140 verifies that the "public" email and phone number match the phone number included in the initial request and the email address linked to that phone number, the authentication server 140 sends an authentication message to the content server 120, and the content server 120 makes the sensitive content accessible to a user of the communication device 110C.

Figure 4:
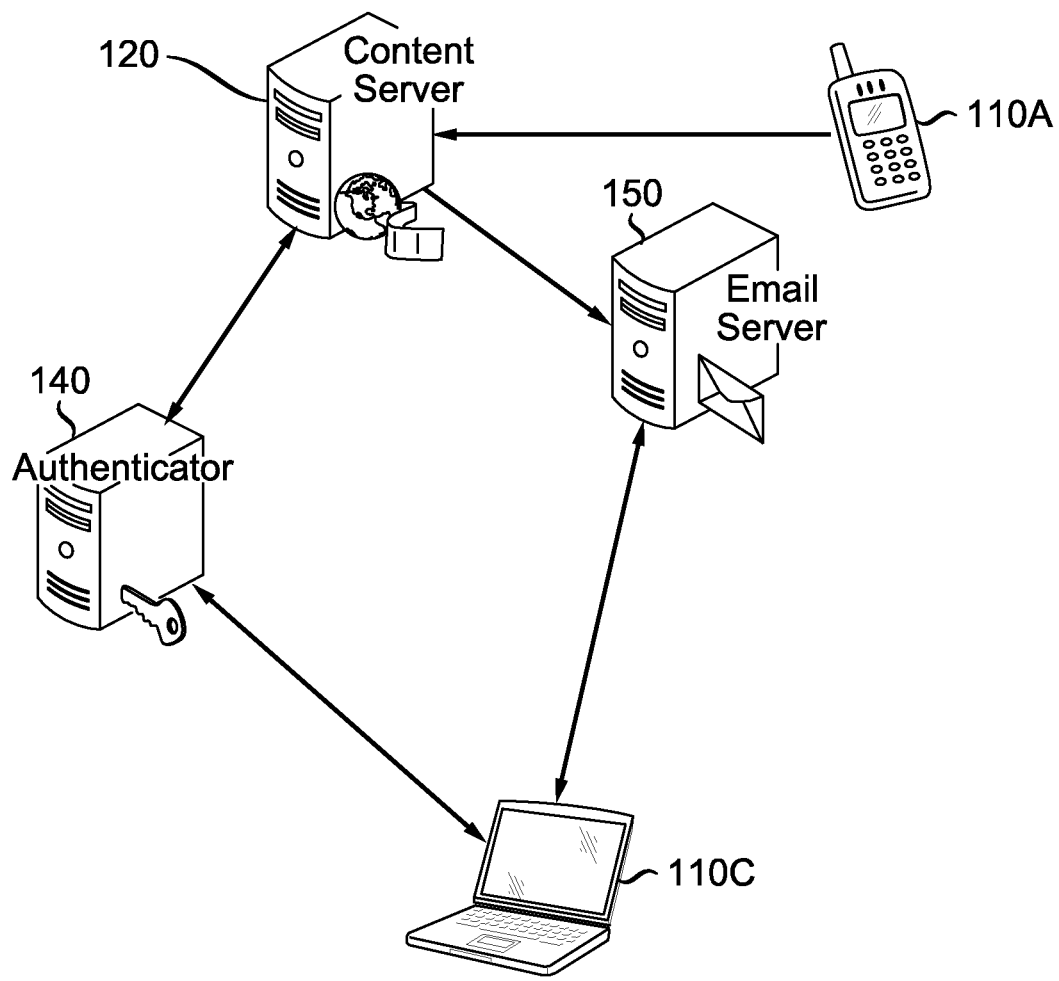
FIG. 4 illustrates an environment in which content may be shored according to yet another illustrative embodiment.

Although the embodiments described above refer to the use of a phone number either as a primary addressing/authentication mechanism or as a mechanism that may be used in combination with other addressing/authentication mechanisms, it should be appreciated that according to another embodiment, a phone number need not be used to share sensitive content. FIG. 4 illustrates an environment in which content may be shared according to this embodiment. In the embodiment shown in FIG. 4, the communication device 110A sends a request to share sensitive content to the content server 120. The request includes an email address associated with the communication device 110C and a link to the sensitive content. The content server 120 sends a message to the authentication server 140 over, e.g., the Internet. The message includes a request to link the URL associated with the sensitive content with the email address received from the communication device 110A. The content server 120 also sends a message including the URL to the email server 150 via, e.g, the Internet. The email server 150, in turn, sends an email message containing the URL to the communication device 110C that may or may not be associated with the communication device 110B.

In a manner similar to that described above, the communication device 110C sends a request for authentication information to the authentication server 140 via, e.g, the Internet. The authentication server 140 sends a challenge request to the communication device 110C, requesting that the communication device 110C provide third party authentication. As described above, third party authentication may be provided by, for example, a user of the communication device 110C logging into a third party website, e.g., Facebook®, and entering, e.g., login data, such as a username and password. Verification that the login information is correct is sent, e.g., by the communication device 110C to the authentication server 140. When the authentication server 140 receives the third party verification, the authentication server 140 sends an authentication message to the content server 120, and the content server 120 makes the sensitive content accessible to a user of the communication device 110C.

FIG. 5 illustrates a block diagram of a computing device with which the content server, the authentication server, the email server, and the address book server may be implemented, according to illustrative embodiments. Although each of these servers will have some different components, the major components described below will be the same for each of these servers. Further, although no connections are shown between the components illustrated in FIG. 5, those skilled in the art will appreciate that the components can interact with each other via any suitable connections to carry out device functions.

It should be understood that FIG. 5 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software in addition to, or instead of, computer readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the devices shown in FIGS. 2 and 3.

Referring to FIG. 5, the computing device 500 may be implemented in any suitable computing device and on any suitable network. According to an illustrative embodiment, the computing device 500 may be implemented on a local network, e.g., a LAN, connected to a public network, e.g., the Internet.

Referring to FIG. 5, the computing device 500 includes a processor 510 that receives inputs and transmits outputs via I/O Data Ports 520. The I/O Data Ports 520 can be implemented with, e.g., an interface including an antenna or other suitable type of transceiver through which data and signals may be transmitted and received wired and/or wirelessly.

For example, in the case of the content server 120, the inputs may include, e.g., requests to share sensitive content from the communication device 110A and authentication messages from the authentication server 140. The outputs may include, e.g., SMS messages to the communication device 110B, and messages to the authentication server 140 and the email server 140. In the case of the authentication server, the inputs may include, e.g., verification data from the cellular network, verification data and requests for authentication data from the communication devices 110B and 110C, and messages from the content server 120 and the address book server 160. The outputs may, e.g., include authentication messages to the content server 120, requests to the address book server 160, and messages to the communication devices 110B and 110C. In the case of the email server 150, the inputs may include, e.g., an email from the content server 120, and the outputs may include, e.g., an email to the communication device 110C. In the case of the address book server 160, the inputs may include, e.g., requests for phone numbers that correspond to email addresses, and the outputs may include, e.g., messages containing phone numbers corresponding to email addresses.

The computing device 500 also includes a physical hard drive 580. The processor 510 communicates with the memory 530 and the hard drive 580 via, e.g., an address/data bus (not shown). The processor 510 can be any commercially available or custom microprocessor. The memory is 530 is representative of the overall hierarchy of memory devices containing the software and data used to implement the functionality of the device 500. The memory 530 can include, but is not limited to the types of memory devices described above. As shown in FIG. 5, the memory 530 may include several categories of software and data used in the device 500, including applications 540, a database 550, an operating system (OS) 560, and input/output (I/O) device drivers 570.

The I/O device drivers 570 may include various routines accessed through at least one of the OS 560 by the applications 540 to communicate with devices and certain memory components.

The applications 540 can be stored in the memory 530 and/or in a firmware (not shown) as executable instructions, and can be executed by the processor 510. The applications 540 include various programs that implement the various features of the device 500.

For example, in the case of the content server 120, the application may include applications for receiving requests to share sensitive content, applications for sending message containing links to sensitive content, and applications for making sensitive content accessible. In the case of the authentication server 140, the applications may include various applications for performing authentication of the communication devices 110B and 110C described above with reference to FIGS. 1-4. In the case of the email server 150, the application may include applications for receiving and sending email. In the case of the address book server 160, the applications, the applications may include applications for receiving requests for phone numbers that correspond to email addresses, applications for determining which phone numbers correspond to which email addresses, and applications for sending responses with phone numbers that correspond to email addresses.

The database 550 represents the static and dynamic data used by the applications 540, the OS 560, the I/O device drivers 570 and other software programs that may reside in the memory. The database may 550 may be used to store various data, e.g., data needed to execute the applications 540.

For example, in the case of the content server 120, the database may include sensitive content and links to the sensitive content. The sensitive content may be provided by the communication device 110A and stored in the content server, or the content server 120 may have the sensitive content stored in advance. In the case of the authentication server 140, the data may include the authentication data described above, e.g., PINS. In the case of the email server, the database may include various email addresses for various communication devices. In the case of the address book server 160, the database may include phone numbers, email addresses, and information used to associate the phone numbers with the email addresses, e.g., names of parties associated with phone number and email addresses.

While the memory 530 is illustrated as residing proximate the processor 510, it should be understood that at least a portion of the memory 530 can be a remotely accessed storage system, for example, a server on a communication network, a remote hard disk drive, a removable storage medium, combinations thereof, and the like. Thus, any of the data, applications, and/or software described above can be stored within the memory 530 and/or accessed via network connections to other data processing systems (not shown) that may include a local area network (LAN), a metropolitan area network (MAN), or a wide area network (WAN), for example.

Figure 6:
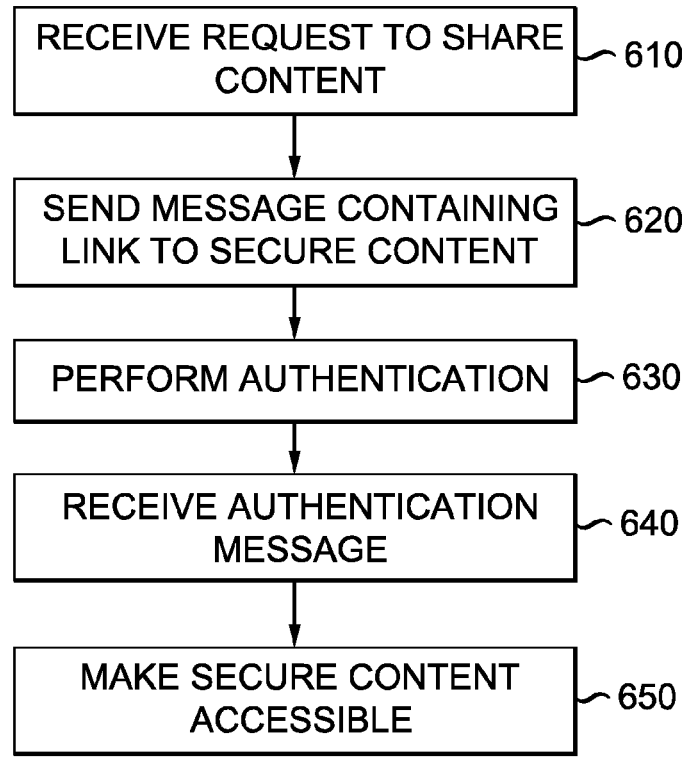
FIG. 6 illustrates a method for sharing sensitive content according to illustrative embodiments.

FIG. 6 illustrates a method for sharing sensitive content according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 6, the method begins at step 610 at which a request to share content is received by the content server 120 from a communication device 110A. The communication device 110A is associated with an account for a communication service provided by a particular network provider. At step 620, a message including a link to the sensitive content is sent from the content server 120 to a communication device 110B or 110C associated with a phone number. The message is addressed to the phone number or to an email address associated with the device 110B or 110C. At step 630, authentication of the communication device 110B and/or 110C is performed in any of the various manners described above with reference to FIGS. 1-4. Once authenticated, at step 640, an authentication message is sent to the content server 120. At step 650, the content server 120 makes the sensitive content accessible to a user of the communication device 110B or 110C without requiring that the second communication device be associated with an account for the communication service provided by the network provider.

According to illustrative embodiments, sensitive content may be shared on a person-by-person basis without requiring a recipient to have an account with the communication service of the content sharer. This makes sharing of sensitive content easy for content recipients, as the recipients do not have to log into an account to receive sensitive content. Also, according to illustrative embodiments, the sharer has control over what recipient device sensitive content is sent to, and the recipient device is authenticated before content is made accessible to the recipient. This provides for sensitive sharing of sensitive information.

The law does not require and it is economically prohibitive to Illustrate and teach every possible embodiment of the present claims. Hence, the above-described embodiments are merely illustrative illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, comprising:
  receiving, by a content server, a request from a first communication device to share sensitive content via a second communication device, wherein the first communication device is associated with an account for a communication service provided by a network provider;
  sending, from the content server, a message including a hyperlink to the sensitive content to the second communication device associated with a phone number, wherein the message is addressed to the second communication device;
  receiving, by the content server, an authentication message indicating that the second communication device is associated with the phone number, wherein the authentication message is sent to the content server by an authentication server; and
  responsive to receipt of the authentication message by the content server, making the sensitive content accessible via the second communication device without requiring that the second communication device be associated with any account for the communication service provided by the network provider, wherein the sensitive content is not made accessible via the second communication device without receipt of the authentication message.

2. The method of claim 1, wherein the message including the hyperlink to the sensitive content is addressed to the phone number.

3. The method of claim 1, wherein the message including the hyperlink to the sensitive content is addressed to an electronic mail address associated with the second communication device.

4. The method of claim 1, wherein the the authentication message is sent to the content server by the authentication server responsive to the receipt of verification data is from the second communication device without requiring input from a user of the second communication device.

5. The method of claim 4, wherein the verification data is received by the authentication server from the second communication device via a communication network, and the verification data includes a header created by the communication network which matches the phone number to which the message containing the sensitive content is addressed.

6. The method of claim 4, wherein the verification data is received by the authentication server from the second communication device responsive to the second communication device:
  receiving a background message addressed to the phone number associated with second communication device, wherein the background message includes a key; and
  sending the verification data including the key to the authentication server.

7. The method of claim 1, wherein the authentication message is sent by the authentication server responsive to receipt of verification data from the second communication device, wherein the verification data is input by a user of the second communication device.

8. The method of claim 1, wherein the authentication message is sent by the authentication server responsive to the authentication server correlating an email address associated with the second communication device with the phone number associated with the second communication device.

9. A content server, comprising:
  a processor; and
  a memory having instructions stored thereon which, when executed by the processor, cause the processor to perform operations comprising:
    receiving a request from a first communication device to share sensitive content via a second communication device, wherein the first communication device is associated with an account for a communication service provided by a network provider;
    sending a message including a hyperlink to the sensitive content to the second communication device associated with a phone number, wherein the message is addressed to the second communication device;
    receiving, from an authentication server, an authentication message indicating that the second communication device is associated with the phone number; and
    responsive to receipt of the authentication message, making the sensitive content accessible via the second communication device without requiring that the second communication device be associated with any account for the communication service provided by the network provider, wherein the sensitive content is not made accessible via the second communication device without receipt of the authentication message.

10. The content server of claim 9, wherein the message including the hyperlink to the sensitive content is addressed to the phone number.

11. The content server of claim 9, wherein the message including the hyperlink to the sensitive content is addressed to an electronic mail address associated with the second communication device.

12. The content server of claim 9, wherein the authentication message is sent by the authentication server responsive to receipt of verification data from the second communication device without requiring input from a user of the second communication device.

13. The content server of claim 12, wherein the verification data is received by the authentication server from the second communication device via a communication network, and the verification data includes a header created by the communication network which matches the phone number to which the message containing the sensitive content is addressed.

14. The content server of claim 12, wherein the verification data is received by the authentication server from the second communication device responsive to the second communication device:
   receiving a background message addressed to the phone number associated with second communication device, wherein the background message includes a key; and
   sending the verification data including the key to the authentication server.

15. The content server of claim 9, wherein the authentication message is sent to the content server by the authentication server responsive to the authentication server correlating an email address associated with the second communication device with the phone number associated with the second communication device.

16. A non-transitory computer readable storage device having instructions stored thereon which, when executed by the processor included in a content server, cause the processor to perform operations comprising:
   receiving a request from a first communication device to share sensitive content via a second communication device, wherein the first communication device is associated with an account for a communication service provided by a network provider;
   sending a message including a hyperlink to the sensitive content to the second communication device associated with a phone number, wherein the message is addressed to the second communication device; and
   receiving, from an authentication server, an authentication message indicating that the second communication device is associated with the phone number; and
   responsive to receipt of the authentication message, making the sensitive content accessible via the second communication device without requiring that the second communication device be associated with any account for the communication service provided by the network provider, wherein the sensitive content is not made accessible via the second communication device without receipt of the authentication message.

17. The non-transitory computer readable storage device of claim 16, wherein the message including the hyperlink to the sensitive content is addressed to the phone number.

18. The non-transitory computer readable storage device of claim 16, wherein the message including the hyperlink to the sensitive content is addressed to an electronic mail address associated with the second communication device.

19. The non-transitory computer readable storage device of claim 16, wherein the authentication message is sent to the content server by the authentication server responsive to receipt of verification data from the second communication device without requiring input from a user of the second communication device.

20. The non-transitory computer readable storage device of claim 16, wherein the authentication message is sent by the authentication server responsive to the authentication server correlating an email address associated with the second communication device with the phone number associated with the second communication device.

* * * * *